US012496242B2

(12) United States Patent
Toratani

(10) Patent No.: US 12,496,242 B2
(45) Date of Patent: Dec. 16, 2025

(54) MAT

(71) Applicant: TORATANI CO., LTD., Ishikawa (JP)

(72) Inventor: Ikuo Toratani, Ishikawa (JP)

(73) Assignee: TORATANI CO., LTD., Ishikawa (JP)

( * ) Notice: Subject to any disclaimer, the term of this patent is extended or adjusted under 35 U.S.C. 154(b) by 223 days.

(21) Appl. No.: 18/035,156

(22) PCT Filed: Mar. 12, 2021

(86) PCT No.: PCT/JP2021/009950
§ 371 (c)(1),
(2) Date: May 3, 2023

(87) PCT Pub. No.: WO2022/190337
PCT Pub. Date: Sep. 15, 2022

(65) Prior Publication Data
US 2024/0009047 A1 Jan. 11, 2024

(51) Int. Cl.
*A61G 7/05* (2006.01)

(52) U.S. Cl.
CPC .................................... *A61G 7/05* (2013.01)

(58) Field of Classification Search
CPC .......... A61G 7/05; A61G 13/10; A61G 13/12; A61G 13/123; A61G 7/07; A47C 27/148; A47C 27/14; A47C 27/146
See application file for complete search history.

(56) References Cited

U.S. PATENT DOCUMENTS 2,818,854 A * 1/1958 Johnson ................. A61G 7/065 606/240
3,626,526 A * 12/1971 Viel ..................... A47C 27/148 5/722
3,742,528 A * 7/1973 Munch .................. A47C 27/20 5/651

(Continued)

FOREIGN PATENT DOCUMENTS

AU 412227 B2 5/1971
JP 1-61163 4/1989

(Continued)

OTHER PUBLICATIONS

International Search Report issued May 25, 2021 in International (PCT) Application No. PCT/JP2021/009950.

(Continued)

*Primary Examiner* — Fredrick C Conley
(74) *Attorney, Agent, or Firm* — Wenderoth, Lind & Ponack, L.L.P.

(57) ABSTRACT

Provided is a mattress that enables promoting breathing in a supine position. The mattress includes: a pair of ilium support portions arranged below respective parts conforming to at least widthwise outer portions of iliac crests of a pair of ilia of a pelvis for individually supporting parts conforming to the pair of ilia from below; and a sacrum adaptation portion arranged between the pair of ilium support portions and located below a sacrum between the pair of ilia of the pelvis. The pair of ilium support portions and the sacrum adaptation portion have such a configuration that a body pressure onto the sacrum adaptation portion is lower than a body pressure onto the pair of ilium support portions.

4 Claims, 11 Drawing Sheets

(56) References Cited

U.S. PATENT DOCUMENTS

| | | | | | |
|---|---|---|---|---|---|
| 4,628,557 | A * | 12/1986 | Murphy | A47C 27/148 5/724 |
| 4,706,313 | A * | 11/1987 | Murphy | A47C 27/148 5/737 |
| 2003/0159699 | A1* | 8/2003 | Anderson | A61G 7/065 128/845 |
| 2010/0223732 | A1* | 9/2010 | Allman | A47C 27/148 428/317.1 |
| 2011/0185508 | A1 | 8/2011 | Hsu et al. | |
| 2012/0110742 | A1 | 5/2012 | Lawler et al. | |
| 2013/0145555 | A1* | 6/2013 | Hargreaves | A47D 15/001 5/655 |
| 2015/0082550 | A1 | 3/2015 | Hui | |

FOREIGN PATENT DOCUMENTS

| | | | | |
|---|---|---|---|---|
| JP | 6-58762 | | 8/1994 | |
| JP | 2000-23795 | | 1/2000 | |
| JP | 2001-258960 | | 9/2001 | |
| JP | 2002-119382 | | 4/2002 | |
| JP | 3094169 | U | 6/2003 | |
| JP | 2004081281 | A * | 3/2004 | A47C 27/144 |
| JP | 3120773 | U | 4/2006 | |
| JP | 2016-506797 | | 3/2016 | |
| JP | 6971516 | B1 * | 11/2021 | A47C 27/146 |
| WO | 2011/007345 | A1 | 1/2011 | |
| WO | 2011/007345 | A9 | 1/2011 | |

OTHER PUBLICATIONS

Extended European Search Report issued Feb. 12, 2025 in corresponding European Patent Application No. 21930189.2, 7 pages.

Office Action issued May 30, 2025 in corresponding Chinese Patent Application No. 202180073299.1, with machine-generated English translation, 17 pages.

* cited by examiner

MAT

TECHNICAL FIELD

The present invention relates to a mattress, particularly to a mattress that enables promoting breathing in a supine position.

BACKGROUND ART

Some mattresses are used to support a body of a lying person. Such a kind of mattress is required to have a function of making a person lying thereon feel comfortable.

The comfortability of a mattress depends on a balance between a repulsive force of the mattress and a body pressure of the person lying on the mattress. The body pressure means a pressure given onto the mattress by the person lying on the mattress, and the distribution thereof varies according to the posture of the body. For example, in the supine position, the highest body pressure is at the buttock. In a case that the mattress supports the whole body of the person in the supine position, a mattress which uniformly has a strong repulsive force is likely to cause the body pressure to concentrate at the buttock and the back to thereby congest the buttock and the back. This consequently increases the roll-over to resolve the congestion, leading to a tendency of a light sleep. In contrast, a mattress which uniformly has a weak repulsive force causes the buttock to sink to a deepest level of the mattress. When being in the supine position, consequently, the spine greatly distorts from the S-shape in an upright position, which causes a lower-back pain and a stoop.

There have been known some mattresses whose repulsive force or surface shape is changed according to a location in a spinal direction of the person in the supine position to improve the comfortability (see, e.g., Patent Literatures 1 to 3). In these mattresses, regions with which the buttock and the back come into contact are set to be softer or lower than the other regions. Accordingly, the body pressure concentrated at the buttock and the back is distributed to other parts so that the mattress receives an almost uniform body pressure over the whole, and the spine in the supine position comes close to the S-shape in the upright position.

In addition to the number of times of the roll-over and the shape of the spine, the depth of the breathing is related to the comfortability. A deeper breathing during the sleeping makes the comfortability more excellent. However, even if the mattress receives the almost uniform body pressure over the whole as described above, the breathing may be likely to be shallow in the supine position. Thus, there is room for improvement in promoting the breathing.

CITATION LIST

Patent Literature

Patent Literature 1: Japanese Unexamined Utility Model Publication No. HEI06-058762

Patent Literature 2: Japanese Unexamined Patent Publication No. 2002-119382

Patent Literature 3: Japanese Unexamined Patent Publication No. 2016-506797

SUMMARY OF INVENTION

The present invention has been made in view of the aforementioned circumstances, and an object thereof is to provide a mattress that enables promoting breathing in a supine position.

A mattress according to a present invention is adapted for supporting at least a part conforming to a pelvis of a person in a supine position, and includes: a pair of ilium support portions arranged below respective parts conforming to at least widthwise outer portions of iliac crests of a pair of ilia of the pelvis for individually supporting parts conforming to the pair of ilia from below; and a sacrum adaptation portion arranged between the pair of ilium support portions and located below a part conforming to a sacrum between the pair of ilia of the pelvis, wherein the pair of ilium support portions and the sacrum adaptation portion have such a configuration that a body pressure onto the sacrum adaptation portion is lower than a body pressure onto the pair of ilium support portions.

DESCRIPTION OF EMBODIMENT

One preferable embodiment of the present invention will be described below with reference to the attached drawings.

Outline of Mattress 1

Figure 1:
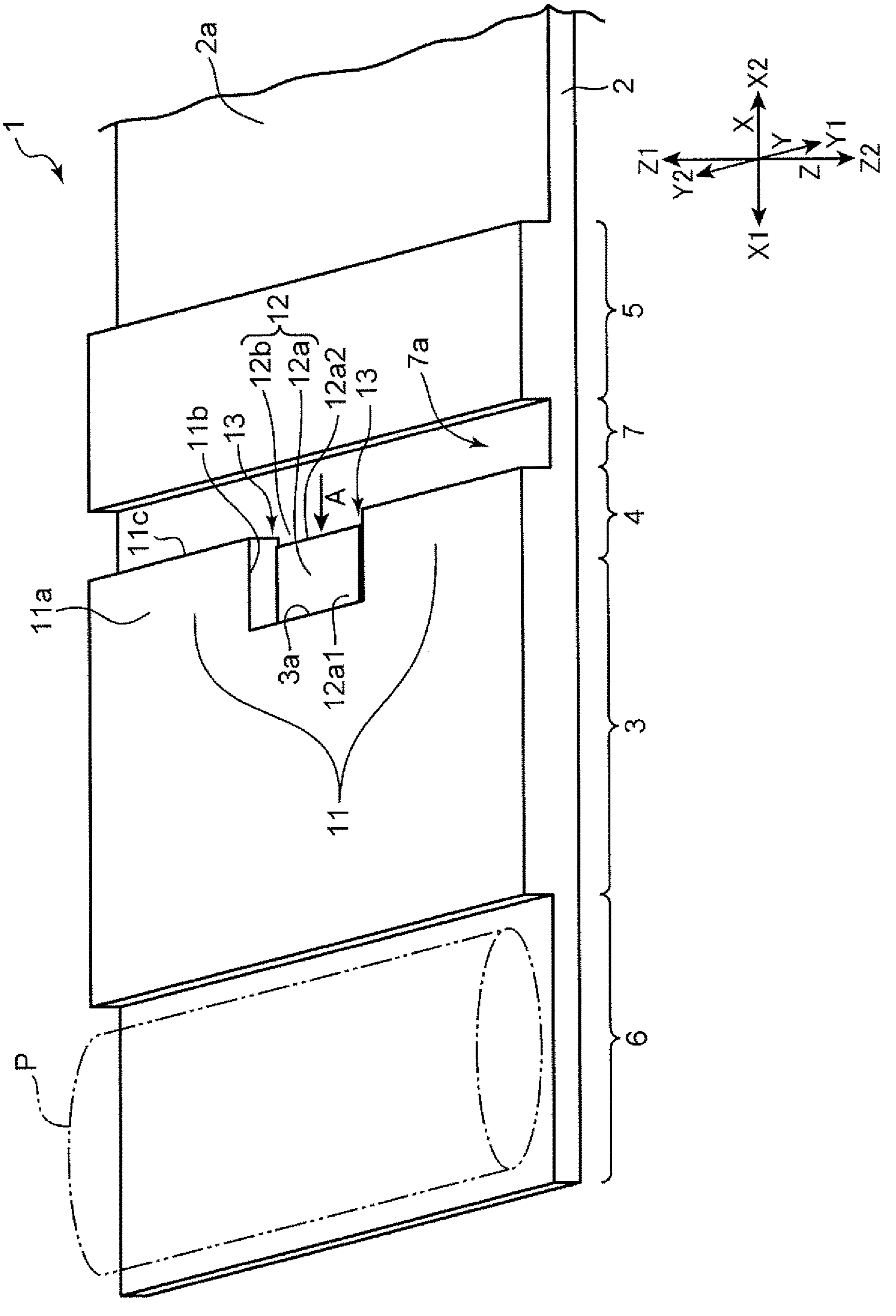
FIG. 1 is a perspective view of a whole structure of a mattress according to an embodiment of the present invention.
Figure 2:
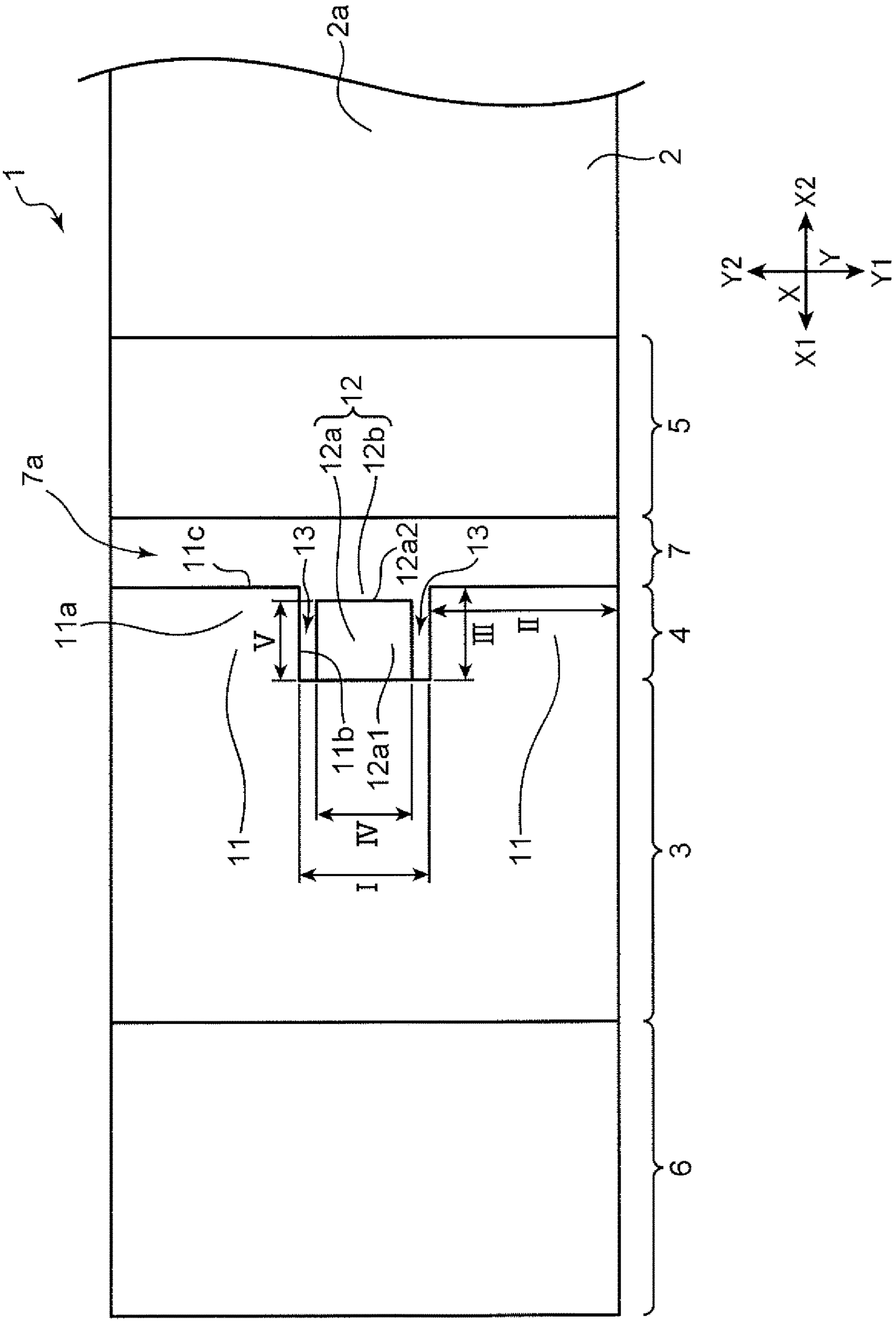
FIG. 2 is a plan view of the mattress in FIG. 1.
Figure 3:
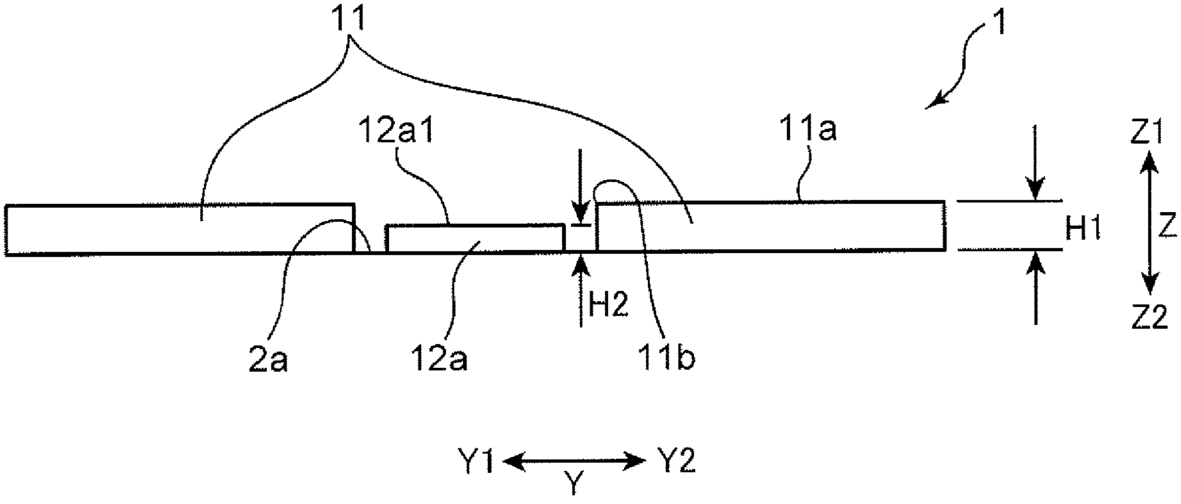
FIG. 3 is a view of the mattress in a direction of an arrow A in FIG. 1.

A mattress 1 shown in FIGS. 1 to 3 is integrally shaped into a thin rectangular cuboid and made of elastic material such as urethane, as an example. The mattress 1 constitutes a bed together with an unillustrated frame or a base supporting the mattress 1. The mattress 1 has such a size as to support the whole body of a person 50 thereon in the supine position on the whole upper surface thereof (see FIGS. 4 and 5). For example, the size of the mattress 1 is set to match a body shape of a normal adult (e.g., a Japanese adult male who is 170 cm tall and weighs 70 kg approximately). In the present invention, the mattress 1 may have a size enough to support at least a part conforming to the pelvis PV of the person 50 in the supine position (see FIGS. 4 and 5).

Directions in the description and the drawings are defined as directions X (head-toward direction X1 and leg-toward direction X2) in which the body of the person 50 in the supine position extends, width directions Y (rightward direction Y1 and leftward direction Y2) of the person 50 in the supine position, and up-down directions Z (upward direction Z1 and downward direction Z2) of the mattress 1.

The mattress 1 has portions which protrude in the upward direction Z1 so as to come into contact with the back 52, the pelvis PV, and a leg of the person 50 in the supine position. Specifically, the mattress 1 includes: a base portion 2 whose shape is a flat rectangular cuboid; and three portions that protrude from an upper surface 2*a* of the base portion 2 in the upward direction Z1, in other words, a back support portion 3, a pelvis support portion 4, and a leg support portion 5. The back support portion 3 supports the back 52 of the person 50 in the supine position (see FIGS. 4 to 5). The pelvis support portion 4 is located away from the back support portion 3 in the leg-toward direction X2 and supports a part conforming to the pelvis PV (see FIGS. 4 to 5). The leg support portion 5 is located away from the pelvis support portion 4 in the leg-toward direction X2 and supports a part conforming to a portion in the vicinity of a femur FM of the leg (see FIGS. 4 to 5).

Figure 4:
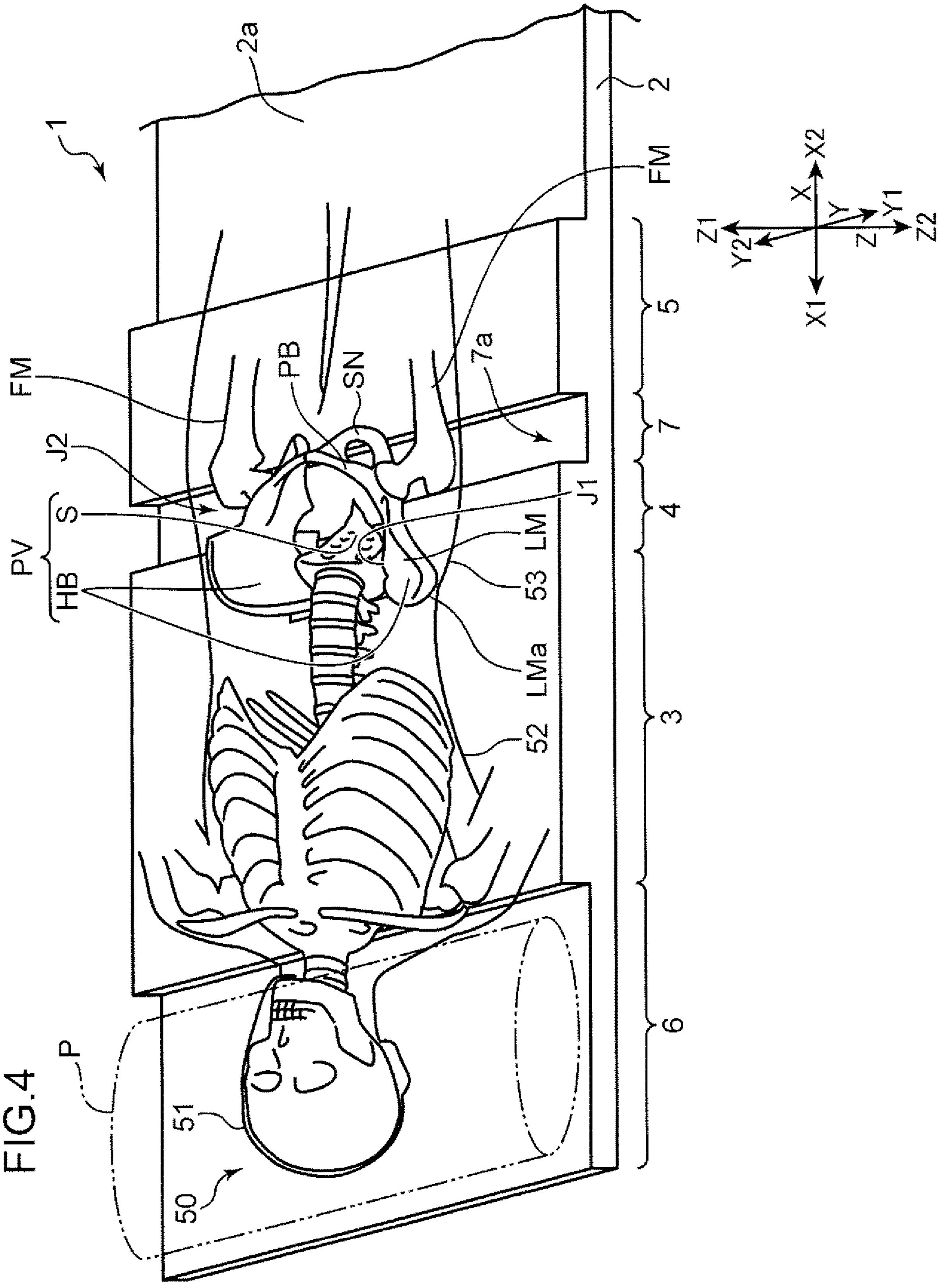
FIG. 4 is an illustration showing a state in which a person is on the mattress in FIG. 1 in a supine position.

The mattress 1 has a head placement region 6 for permitting a placement of the head 51 away from the back support portion 3 in the head-toward direction X1 (see FIG. 4). The head placement region 6 has an exposed upper surface 2*a* of the base portion 2, on which a pillow P for supporting the head 51 is placed.

Figure 5:
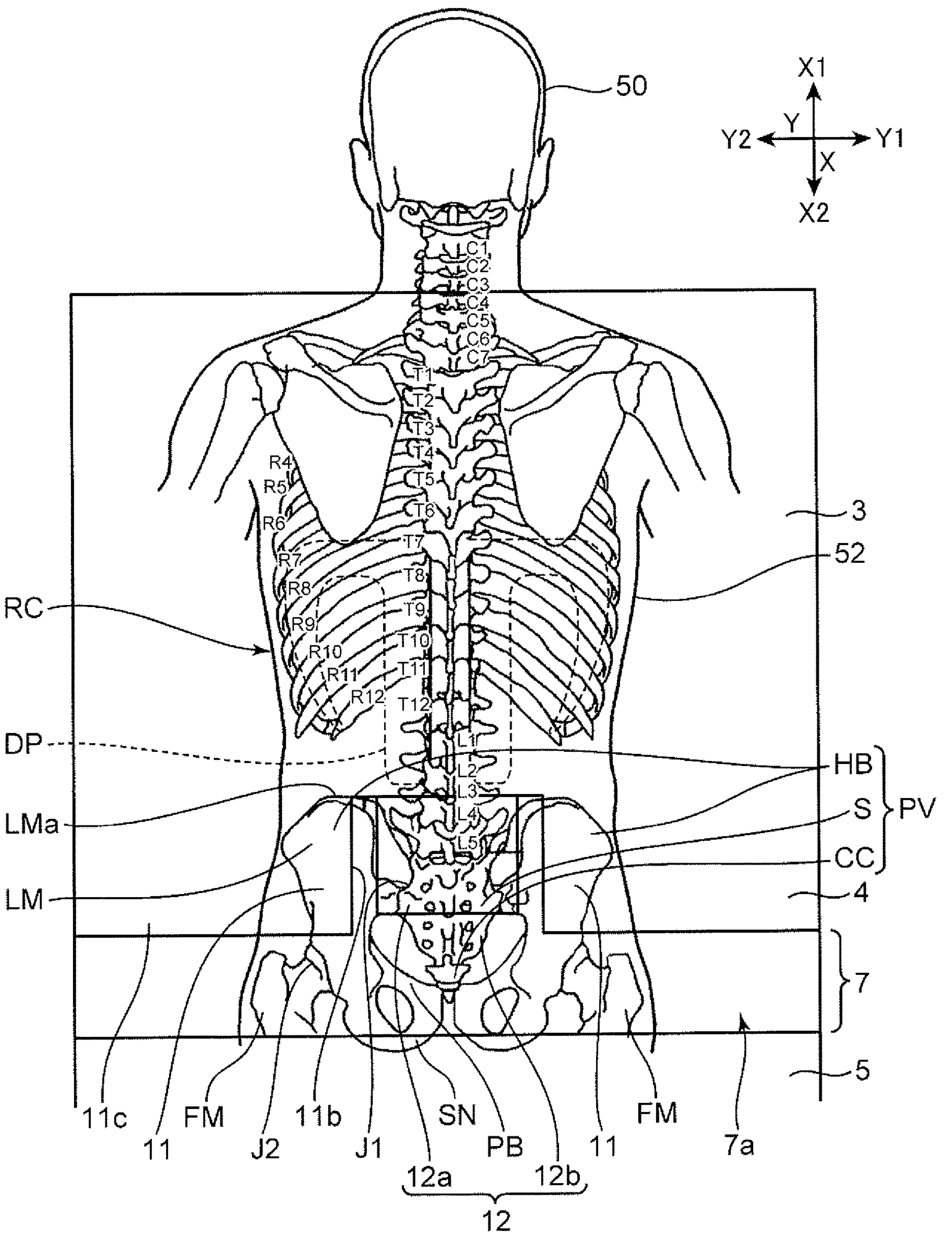
FIG. 5 is an underside view of the mattress and the person, schematically showing a relative positional relationship between the mattress in FIG. 1 and a skeleton of the person in the supine position.

A hip joint placement region 7 is formed between the pelvis support portion 4 and the leg support portion 5 of the mattress 1, and has a space 7*a* over which a hip joint J2 is placed (see FIGS. 4 to 5). Since the hip joint J2 of the person 50 in the supine position is received in the space 7*a* and is not pressed by the mattress 1, the movement of a pair of hip bones HB in the width directions Y, which will be described later, is not hindered.

The pelvis support portion 4 (specifically, an ilium support portion 11, which will be described later) and the leg support portion 5 are squashed due to the weight of the person 50 in the supine position. However, the space 7*a* is not filled by the one in the supine position. Thus, the hip joint J2 is in a non-support state. The space 7*a* is set to have such a depth as not to be filled by the person 50 due to the weight. The pressure onto the hip joint 32 can be prevented by making the height of the hip joint placement region 7 identical to those of the pelvis support portion 4 and the leg support portion 5 and forming the hip joint placement region 7 of a material having a low hardness, instead of by forming the space 7*a*.

Description of Pelvis PV

Figure 6:
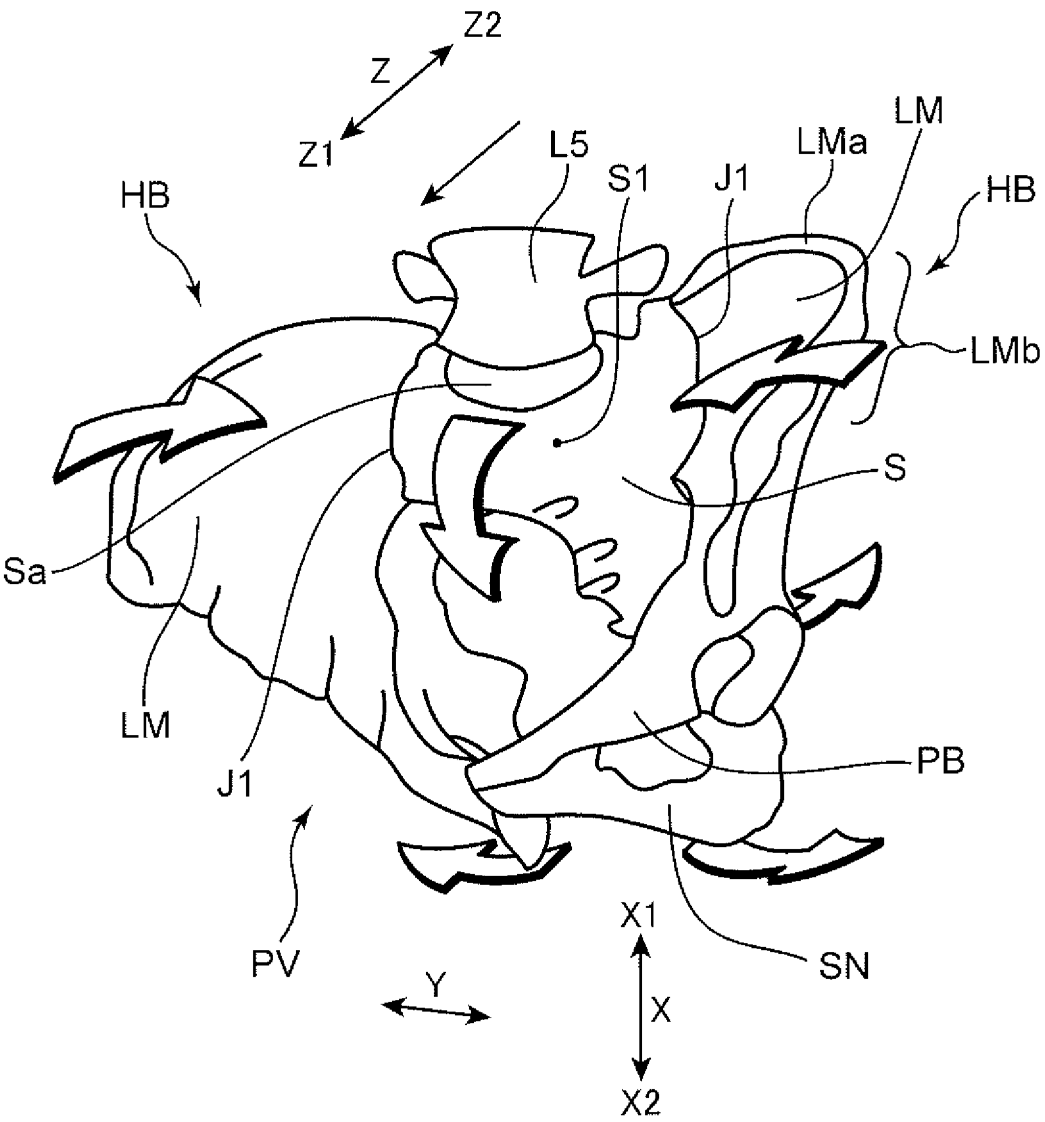
FIG. 6 is a perspective view of a pelvis illustrating nutation of a sacrum.

The pelvis PV, which is supported by the pelvis support portion 4, will be described. As shown in FIGS. 4 to 6, the pelvis PV includes a pair of hip bones HB spaced away from each other in the width directions Y, a sacrum S located between the pair of hip bones HB, and a coccyx CC connected to an end portion of the sacrum S in the leg-toward direction X2.

The hip bone HB includes an ilium LM that forms a portion thereof in the head-toward direction X1, an arc-shaped pubis PB extending from an end portion of the ilium LM in the leg-toward direction X2 to the front (in the upward direction Z1 in FIG. 4) and the center of the body, and an arc-shaped ischium SN extending from the ilium LM and curved in the leg-toward direction X2 to be connected with an end portion of the pubis PB closer to the center of the body. Each of the pair of ilia LM and the sacrum S are connected with each other by a sacroiliac joint J1.

As shown in FIGS. 4 to 6, the ilium LM is a curved, plate-like thin bone. The ilium LM includes an iliac crest LMa in an end portion thereof in the head-toward direction X1, which is an arc-shaped ridge portion curved outward in the width directions Y and forward (in the upward direction Z1 in FIG. 4) with respect to the body. In other words, the iliac crest LMa is an edge of the ilium LM closer to the head 51 (in the head-toward direction X1) of the person 50 in the supine position.

Detailed Description of Pelvis Support Portion 4

The pelvis support portion 4 in the embodiment has the following configuration to support the part conforming to the pelvis PV having the above-mentioned structure.

As shown in FIGS. 1 to 5, the pelvis support portion 4 includes a pair of ilium support portions 11 spaced away from each other in the width directions Y, and a sacrum support portion 12*a* arranged between the pair of ilium support portions 11. In the embodiment, the sacrum support portion 12*a* and the ilium support portions 11 on both sides thereof are separated by gaps 13 (see FIGS. 1 and 2). Thus, an effect of a body pressure onto the ilium support portion 11 on the sacrum S can be prevented, and nutation of the sacrum S which will be described later is not obstructed.

Figure 7:
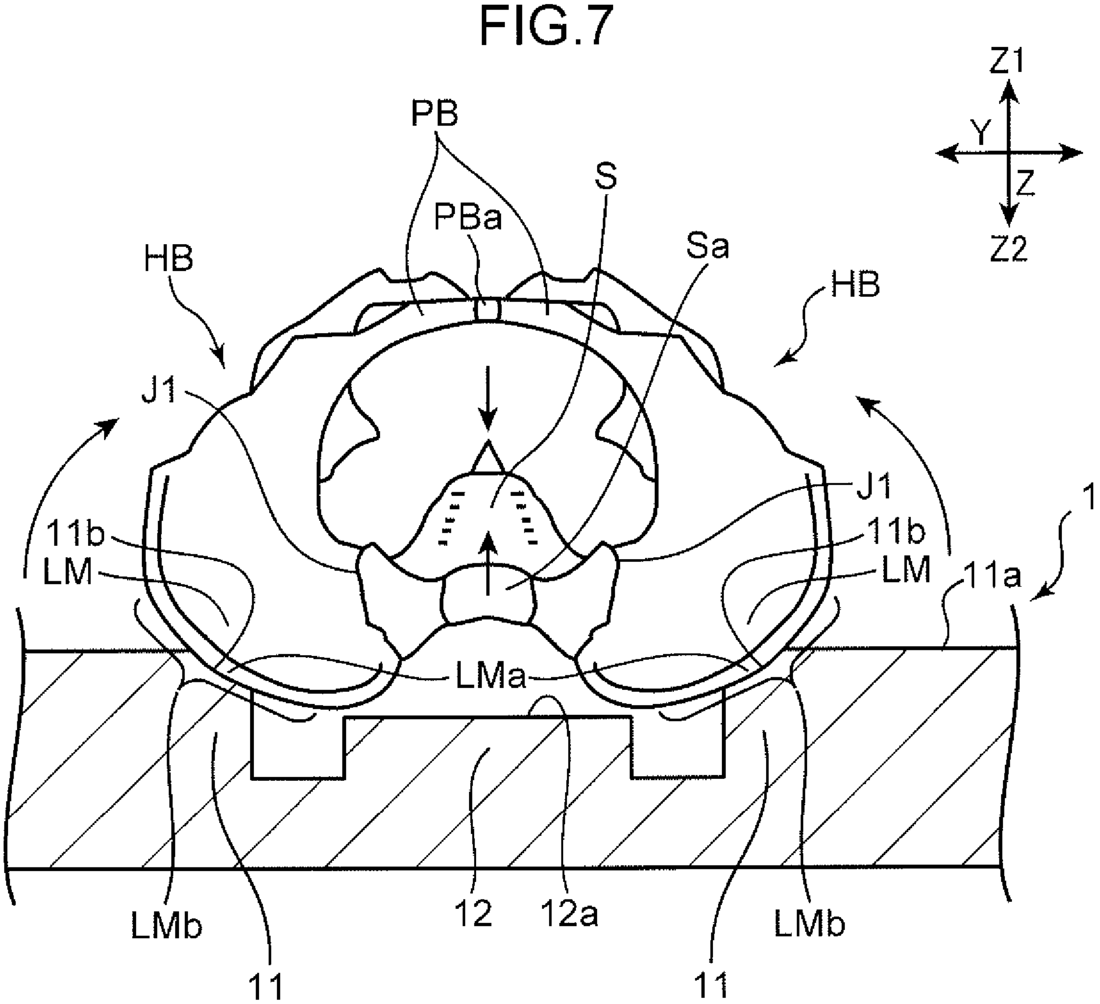
FIG. 7 is a cross-sectional view schematically illustrating medial rotation of a pair of ilia and nutation of the sacrum of the person in the supine position on the mattress in FIG. 1.

The pair of ilium support portions 11 is arranged at respective positions away from the iliac crests LMa of the pair of ilia LM of the pelvis PV in the downward direction Z2 so as to come into contact with parts conforming to at least outer portions LMb of the iliac crests LMa in the width directions Y (see FIG. 7). As shown in FIG. 7, the outer portion LMb of the iliac crest LMa in the width directions Y means a portion of the iliac crest LMa in the downward direction Z2 facing outward in the width directions Y. Thus, as shown in FIG. 7, the pair of ilium support portions 11 can individually support the parts conforming to the pair of ilia LM underneath Z2. Each ilium support portion 11 has a placement surface 11*a* over which the ilium LM is placed, an inner upper edge 11*b* that is an edge of the placement surface 11*a* closer to the center in the width directions Y of the mattress 1, and a leg side edge 11*c* that is an edge of the placement surface 11*a* in the leg-toward direction X2.

The placement surface 11*a* has a shape of a rectangle in a plan view, which has the same height as an upper surface of the back support portion 3 and is continuous with the upper surface. The placement surface 11*a* may be higher than the upper surface of the back support portion 3.

The placement surface 11*a* is set to have such a size as to come into contact with the part conforming to at least the outer portion of the iliac crest LMa in the width directions Y of a Japanese adult male, i.e., the part conforming to the widthwise outer portion LMb (see FIG. 7) of the iliac crest LMa but as not to come into contact with parts conforming to the pubis PB and the ischium SN. In this regard, as shown in FIG. 2, in a case that the interval I between the pair of ilium support portions 11 is set to be about 20 cm (e.g., 15 to 25 cm), the width II (length in the width directions Y) of the placement surface 11*a* is set to be 9 cm or more, and the depth III (length in longitudinal directions X) thereof is set to be about 11.5 cm (e.g., 10 to 15 cm).

Figure 8:
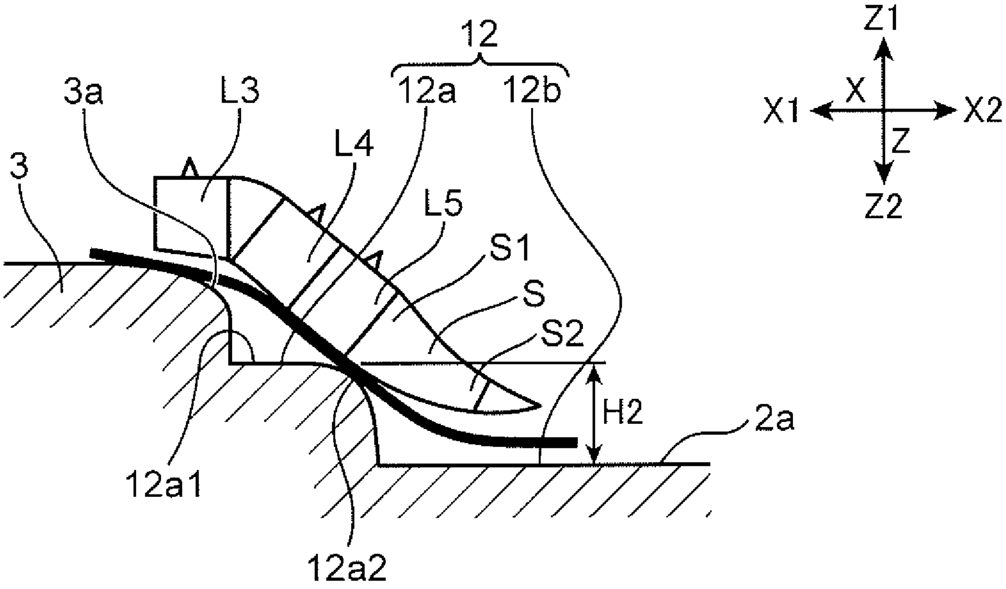
FIG. 8 is a cross-sectional view illustrating a state of a part conforming to the sacrum of the person on the mattress in FIG. 1 in the supine position being supported by a sacrum support portion.

The sacrum adaptation portion 12 is arranged between the pair of ilium support portions 11, and is located away in the downward direction Z2 from a part conforming to the sacrum S between the pair of ilia LM of the pelvis PV. As shown in FIGS. 1, 2, and 8, the sacrum adaptation portion 12 includes a sacrum support portion 12*a* having a height H2 lower than a height H1 (see FIG. 3) of the ilium support portion 11 for supporting a part conforming to a portion S1 of the sacrum S in the head-toward direction X1 of the person 50 in the supine position, and a sacrum non-support portion 12*b* having a height lower than the height H2 of the sacrum support portion 12*a* and spaced away in the downward direction Z2 from a portion S2 of the sacrum S in the leg-toward direction X2 to render non-support to a part conforming to the portion S2 in the leg-toward direction X2.

The sacrum support portion 12*a* supports the part conforming to the portion S1 of the sacrum S in the head-toward direction X1 of the person in the supine position underneath Z2. The sacrum support portion 12*a* has a placement surface 12*a*1 on which a part conforming to the sacrum S is placed and a leg side edge 12*a*2, which is an edge of the placement surface 12*a*1 in the leg-toward direction X2.

The placement surface 12*a*1 has a shape of a rectangular and horizontally flat plane in a plan view, which is lower than the placement surface 11*a* of the ilium support portion 11 and the upper surface of the back support portion 3. For example, the placement surface 12*a*1 is set to have such a size as to come into contact with at least the part conforming to the portion S1 of the sacrum S in the head-toward direction X1 of a Japanese adult male but as not to come into contact with the part conforming to the ilium LM. In this case, for example, as shown in FIG. 2, the width IV (length in the width directions Y) of the placement surface 12*a*1 is set to be about 8 to 10 cm and the depth V (length in the longitudinal directions X) thereof is set to be about 8 to 12 cm (and smaller than the depth III of the placement surface 11*a*). The depth V is preferably set to be about 6 to 12 cm.

The sacrum non-support portion 12*b* renders non-support to the part conforming to the portion. S2 of the sacrum S in the leg-toward direction X2. The sacrum non-support portion 12*b* is a plane located lower than the placement surface 12*a*1 of the sacrum support portion 12*a* and away from the leg side edge 12*a*2 in the leg-toward direction X2. The sacrum non-support portion 12*b* in the embodiment has the same height as the upper surface 2*a* of the base portion 2, but may be higher than the upper surface 2*a* unless the sacrum non-support portion 12*b* comes into contact with the part conforming to the portion S2 of the sacrum S in the leg-toward direction X2. The sacrum non-support portion 12*b* in the invention is supposed to give no body pressure onto the sacrum non-support portion 12*b* in a case that the person 50 in the supine position has a normal body shape and weight. However, a heavy person may sink into the mattress 1; in this case, the sacrum non-support portion 12*b* may give a slight body pressure onto the sacrum non-support portion 12*b* onto the part conforming to the sacrum. Also in this case, the body pressure onto the sacrum non-support portion 12*b* is still lower than the body pressure onto the ilium support portion 11.

The pair of ilium support portions 11 and the sacrum adaptation portion 12 have such a configuration that the body pressure onto the sacrum adaptation portion 12 onto the part conforming to the sacrum S of the person 50 in the supine position is lower than the body pressures from the pair of ilium support portions 11 onto the parts conforming to the pair of ilia LM of the person 50 in the supine position. In the embodiment, a relative height difference is made between the ilium support portion 11 and the sacrum support portion 12*a* to reduce the body pressure onto the sacrum support portion 12*a* partially. In this regard, the body pressure onto the sacrum support portion 12*a* may be reduced partially by differentiating the hardness between the ilium support portion 11 and the sacrum support portion 12*a*, as in a modification described later. Further, a configuration as in a modification (see FIG. 10) described later, in which the whole of the sacrum adaptation portion 12 includes a sacrum non-support portion 12*b* that renders non-support to the sacrum S, may allow the body pressure onto the sacrum adaptation portion 12 (i.e., the sacrum non-support portion 12*b*) to be zero. In other words, the body pressure onto the sacrum adaptation portion 12 can be zero in the invention.

The respective body pressures from the ilium support portion 11 and the sacrum adaptation portion 12 are measured with, e.g., an existing body pressure measuring instrument. The body pressure measuring instrument determines a load on each divisional cell of a matrix of the region on the mattress 1 as the body pressure. With the body pressure measuring instrument, each body pressure onto the ilium support portion 11 and the sacrum support portion 12*a* can be determined as the average value of the body pressure onto the ilium support portion 11 onto the region of the part conforming to the iliac crest LMa and the average value of the body pressure onto the sacrum adaptation portion 12 onto the region of the part conforming to the sacrum S.

In a specific case that a relative height difference is made between the ilium support portion 11 and the sacrum support portion 12*a*, the height H1 of the ilium support portion 11 is set to be greater than the height H2 of the sacrum support portion 12*a*, as shown in FIG. 3. The height H1 of the ilium support portion 11 with respect to the upper surface 2*a* of the base portion 2 is set to be, for example, about 5 mm to 4 cm, preferably about 2 cm, in accordance with the hardness of the mattress. In a case that the height H1 of the ilium support portion 11 is less than 5 mm, the effect of supporting the outer portion LMb of the iliac crest LMa in the width directions Y cannot be obtained; on the other hand, in a case that the height H1 is greater than 4 cm, the ilium support portion 11 protrudes too far from the back support portion 3 of the mattress 1, which causes a problem such as discomfort. In order to resolve these problems, the height H1 of the ilium support portion 11 is preferably set to be about 5 mm to 4 cm as described above.

In the embodiment, the height of the back support portion 3 and that of the leg support portion 5 are set to be the same as the height of the ilium support portion 11, but the invention is not limited thereto. The height of the ilium support portion 11 may be set to be greater than those of the back support portion 3 and the leg support portion 5.

The height H2 of the sacrum support portion 12*a* is set such that it can support the part conforming to the sacrum S so that the body pressure onto the sacrum support portion 12*a* onto the part conforming to the sacrum S is lower than the body pressure onto the ilium support portion 11 onto the part conforming to the ilium LM. Specifically, the height H2 of the sacrum support portion 12*a* is set to be lower than the height H1 of the pair of ilium support portions 11 and so that the sacrum support portion 12*a* can come into contact with the part conforming to the sacrum S as shown in FIG. 8; for example, the height H2 is set to be about 1 cm. The height H2 of the sacrum support portion 12*a* may be to such an extent that at least a part of the sacrum support portion 12*a*, specifically, the leg side edge 12*a*2 can come into contact with the part conforming to the sacrum S.

Description of Relationship Between Exhalation and Nutation of Sacrum S

The present inventor has made eager studies on the tendency toward shallow breathing in the supine position, found that the breathing in the supine position is affected by obstruction of nutation of the sacrum in the supine position, and made research to remove a factor of the obstruction of the nutation of the sacrum as described below.

For the breathing during the sleeping, which is an unconscious natural breathing, it is important how abundantly the natural breathing is performed. For the breathing, exhalation (breathing out) is important, and how much one exhales is deeply related to an amount of an inhalation. A deep exhalation allows much inhalation in accordance with the amount of the exhalation. A deep natural breathing during the sleeping prevents the blood oxygen level from lowering. An abundant exhalation makes the vagus nerve dominant, leading to a good sleep.

The exhalation can be promoted by facilitating movement of a diaphragm DP in the head-toward direction X1 to contract a rib cage RC shown in FIG. 5. The diaphragm DP is a muscular membrane that closes a lower end of the rib cage RC. The diaphragm DP has a shape of a dome protruding in the head-toward direction X1, which is in the dome shape when relaxed (in exhaling) and becomes flat with a center portion thereof moving in the leg-toward direction X2 when tensed (in inhaling). The diaphragm DP is connected to the vicinity of the second lumbar vertebra L2 continued to the sacrum S, specifically, connected to the lumbar vertebrae L1 to L3. When the sacrum S shown in FIGS. 4 to 7 nutates, i.e., tilts forward with respect to the person 50 (in the same direction as the upward direction Z1 in FIG. 4), the lumbar vertebrae L1 to L5 connected to the sacrum S move forward, facilitating relaxing of the diaphragm DP in the dome shape connected to the lumbar vertebrae L1 to L3 accordingly. This facilitates the movement of the diaphragm DP in the head-toward direction X1. Thus, the exhalation is promoted.

Since the sacroiliac joints J1 that connect the sacrum S and the pair of ilia LM are surrounded by many strong ligaments, the sacrum S cannot move independently. Therefore, the present inventor thought of promoting the nutation of the sacrum S utilizing the linked movement of the pair of ilia LM and the sacrum S.

As shown in FIG. 6, when the sacrum S nutates, a force is applied to each ilium LM of the pair of hip bones HB, so that the outer portion LMb of the iliac crest LMa in the width directions Y, which is the end portion of the ilium LM in the head-toward direction X1, moves forward with respect to the body (in the same direction as the upward direction Z1 in FIG. 4). Thus, the pair of ilia LM moves in such directions as to close inward (toward the center of the body), which provides a gap or play at the sacroiliac joint J1 to facilitate the movement of the sacrum S. In this regard, a sacral promontory Sa, which is an end portion of the sacrum S in the head-toward direction X1, moves forward (in the same direction as the upward direction Z1 in FIG. 4), and a portion of the sacrum S in the leg-toward direction X2 moves rearward (in the same direction as the downward direction Z2 in FIG. 4), enabling the whole of the sacrum S to smoothly nutate forward (in the direction Z1). A broader nutation of the sacrum S relaxes the diaphragm DP connected to the vicinity of the second lumbar vertebra L2 (from L1 to L3) so as to facilitate the movement thereof in the head-toward direction X1, which makes the breathing abundant. In this regard, the contraction of a lower portion of the rib cage RC for the exhalation becomes abundant.

The mattress 1 in the embodiment removes the obstruction of the nutation of the sacrum S due to the pressure of the mattress 1 onto the sacrum S in the supine position. Consequently, a movable range of the sacrum S can be extended.

As shown in FIG. 6, when the sacrum S nutates, the ilia LM of the hip bones HB move inward in the width directions Y. Thus, the space between the pair of ilia LM becomes narrower, increasing the pressure in the abdominal cavity. This further facilitates the movement of the diaphragm DP in the head-toward direction X1. The pubis PB and the ischium SN, which are the portions of the hip bones HB other than the ilia LM, moves outward in the width directions Y (i.e., in directions along which the pubic symphysis PBa in FIG. 7 is opened).

On the other hand, after the nutation of the sacrum S and the exhalation for a while, the sacrum S performs counternutation, which is a counter action of the nutation. In the counternutation of the sacrum S, the sacral promontory Sa of the sacrum S in the head-toward direction X1 moves rearward (in the same direction as the downward direction Z2 in FIG. 4), and the portion of the sacrum S in the leg-toward direction X2 moves forward (in the same direction as the upward direction Z1 in FIG. 4). A counternutation of the sacrum S causes the diaphragm DP connected to the vicinity of the second lumbar vertebra L2 (from L1 to L3) to move in the leg-toward direction X2, causing the rib cage RC to expand. This allows much inhalation.

Features of Embodiment (1) The present inventor has repeatedly made eager studies on promoting the breathing in the supine position with focusing on the movement of the pelvis PV as described above, to find that promoting the nutation of the sacrum S located between the pair of ilia LM of the pelvis PV tilting forward (in the same direction as the upward direction Z1 in FIG. 4) leads to promoting the breathing, achieving the invention of the mattress 1 having the configuration above.

A generally uniformly flat mattress gives body pressure onto both the ilium LM and the sacrum S in the supine position; particularly, the sacrum S is likely to receive a higher body pressure. In this case, the nutation of the sacrum. S is obstructed and the breathing is not promoted.

In contrast, the mattress 1 in the embodiment includes the ilium support portion 11 as described above, and the height of the sacrum support portion **12*a* in the up-down directions Z is set to be lower than that of the ilium support portion 11. Therefore, the body pressure onto the sacrum support portion 12*a* becomes lower than the body pressure onto the ilium support portion 11**. Thus, the sacrum S can smoothly nutate.

Additionally, a lowered body pressure onto the sacrum support portion **12*a* makes a relatively increased body pressure onto the ilium support portion 11**. Thus, the sacroiliac joint J1 is opened while the outer portions LMb of the iliac crests LMa of the pair of ilia LM are pressed in closing directions (toward the center of the body in the width directions Y). Accordingly, the nutation of the sacrum S is promoted. Therefore, the sacrum S smoothly nutates even in the supine position, enabling the deep breathing during the sleeping to thereby improve the comfortability.

In other words, in order to promote the nutation of the sacrum S, as shown in FIGS. 1 to 5, the mattress 1 in the embodiment includes: the pair of ilium support portions 11 arranged at respective positions away from the iliac crests LMa, which are edges closer to the head of the person 50 (in the head-toward direction X1) in the supine position, of the pair of ilia LM of the pelvis PV in the downward direction Z2 so as to come into contact with parts conforming to at least outer portions LMb of the iliac crests LMa in the width directions Y; and the sacrum adaptation portion 12 including the sacrum support portion 12*a* and the sacrum non-support portion 12*b* arranged between the pair of the ilium support portions 11.

Thus, as shown in FIGS. 4, 5, and 7, when the person 50 is in the supine position on the mattress 1 having the configuration above, the pair of ilium support portions 11 (specifically, the inner upper edges 11*b* of the ilium support portions 11 and the portions therearound) can individually support the parts conforming to the pair of ilia LM underneath Z2 with coming into contact with the respective parts conforming to the iliac crests LMa of the pair of ilia LM. At this time, the pair of ilia LM receives a reaction force (body pressure) from the ilium support portions 11 on the parts conforming to the iliac crests LMa, which promotes the movement of turning forward (in the same direction as the upward direction Z1) and toward the center in the width directions Y with respect to the body (i.e., rotating medially).

In the mattress 1 above, the pair of ilium support portions 11 and the sacrum adaptation portion 12 (i.e., the sacrum support portion 12*a* and the sacrum non-support portion 12*b*) have such a configuration that the body pressure onto the sacrum adaptation portion 12 onto the part conforming to the sacrum S of the person 50 in the supine position is lower than the body pressure onto the pair of ilium support portions 11 onto the parts conforming to the pair of ilia LM of the person 50 in the supine position. Thus, the sacrum S between the pair of ilia LM can turn forward (in the same direction as the upward direction Z1) and in the leg-toward direction X2 in accordance with the medial rotation of the pair of ilia LM, i.e., can nutate, without being obstructed by the reaction force (body pressure) from the sacrum adaptation portion 12.

In the nutation of the sacrum S, as described above and as shown in FIGS. 6 and 7, the sacral promontory Sa, which is the end portion of the sacrum S in the head-toward direction X1, moves forward (in the same direction as the upward direction Z1 in FIG. 4), and the portion of the sacrum S in the leg-toward direction X2 moves rearward (in the same direction as the downward direction Z2 in FIG. 4). Thus, the whole of the sacrum S nutates forward (in the direction Z1). In this regard, FIG. 7 shows a state just before the nutation of the sacrum S; FIG. 8 shows a state after the nutation of the sacrum S, in which the part conforming to the sacrum S comes into contact with the leg side edge 12*a*2 of the placement surface 12*a*1 of the sacrum support portion 12*a* and the portions therearound.

The nutation of the sacrum S causes the diaphragm DP connected to the lumbar vertebrae L1 to L3 in the vicinity of the second lumbar vertebra L2 continued to the sacrum S to move in the direction X1 toward the head of the person 50 in the supine position (see FIG. 5). This makes the rib cage RC contract, thereby facilitating the exhalation. When the exhalation is facilitated, the inhalation, which is the counter action thereof, is also facilitated. Consequently, the breathing in the supine position can be promoted.

A normal evenly flat mattress on the market supports the part conforming to the sacrum S so that the part receives the same body pressure as the body pressure that the parts conforming to the ilia LM on both sides thereof receive. Thus, the sacroiliac joints J1 that connect the sacrum S with the ilia LM on both sides thereof are not relaxed. Therefore, the sacrum S cannot tilt forward with respect to the ilia LM, i.e., cannot nutate. On the other hand, in the mattress 1 in the embodiment, since the body pressure that the parts conforming to the pair of ilia LM receives and the body pressure that the part conforming to the sacrum S receives are made different from each other, the sacrum S can smoothly nutate.

(2) The mattress 1 in the embodiment is integrally made of a single material such as urethane, and the height H1 of the ilium support portion 11 is set to be greater than the height H2 of the sacrum support portion 12*a* of the sacrum adaptation portion 12 as shown in FIG. 3. In this configuration, the ilium support portion 11 can reliably support the part conforming to the ilium LM to promote the medial rotation of the ilium LM and the nutation of the sacrum S, while reducing the reaction force (body pressure) from the sacrum support portion 12*a* onto the part conforming to the sacrum S. Consequently, the breathing in the supine position can be reliably promoted.

(3) The mattress 1 in the embodiment includes the back support portion 3 that supports the back 52 of the person 50 in the supine position. The height of the back support portion 3 is set to be the same as that of the ilium support portion 11. In this configuration, the mattress 1 supports the back 52 and the part conforming to the ilium LM of the person 50 in the supine position on the same plane. Thus, the discomfort due to the ilium support portion 11 protruding in the upward direction Z1 can be reduced.

(4) The sacrum adaptation portion 12 of the mattress 1 in the embodiment includes: the sacrum support portion 12*a* having the height H2 lower than the height H1 of the ilium support portion 11 for supporting the part conforming to the portion S1 of the sacrum S in the head-toward direction X1 of the person 50 in the supine position, and the sacrum non-support portion 12*b* having the height lower than the height H2 of the sacrum support portion 12*a* and spaced away in the downward direction Z2 from the portion S2 of the sacrum S in the leg-toward direction X2 of the person 50 in the supine position to render non-support to the part conforming to the portion S2 in the leg-toward direction X2.

After the nutation of the sacrum 5, the portion S1 of the sacrum S in the head-toward direction X1 is located away in the upward direction Z1 from the portion S2 thereof in the leg-toward direction X2. Therefore, in the configuration above, the sacrum support portion 12*a* partially supports the part conforming to the portion S1 of the sacrum S in the head-toward direction X1, and the sacrum non-support portion 12*b*, which is spaced away from the portion S2 in the downward direction Z2, renders non-support to the part conforming to the portion S2 in the leg-toward direction X2. This enables adjusting the body pressure onto the ilium support portion 11, the body pressure onto the sacrum support portion 12*a*, and the body pressure onto the sacrum non-support portion 12*b* so as to gradually lower one after another in this order. Additionally, it is possible to further lower the average body pressure onto the sacrum S from the whole of the sacrum adaptation portion 12 with keeping the sacrum S tilting forward. This can promote a smooth nutation of the sacrum S. Consequently, the breathing in the supine position can be more reliably promoted.

(5) In the mattress 1 in the embodiment, the height H2 of the sacrum support portion 12*a* is set such that it can support the sacrum S so that the body pressure onto the sacrum support portion 12*a* onto the part conforming to the sacrum S is lower than the body pressure onto the ilium support portion 11 onto the part conforming to the ilium LM, as shown in FIG. 8.

This configuration eases the visible positioning. Further, the adjustment of the body pressure by height enables estimation of the body pressure in manufacturing a mattress, thereby easing the product management. The sacrum support portion 12*a* can support the sacrum S so that it can nutate. Consequently, a load on the lumbar vertebrae L3 to L5 connected to the sacrum S can be reduced.

(6) In the embodiment, as shown in FIGS. 1 to 5, the hip joint placement region 7 is formed between the ilium support portion 11 of the pelvis support portion 4 and the leg support portion 5. The hip joint placement region 7 has the space 7*a* over which the hip joint J2 is placed (see FIGS. 4 to 5). Thus, the hip joint J2 of the person 50 in the supine position is received in the space 7*a* and is not pressed by the mattress 1. Accordingly, the movement of the pair of hip bones HB in the width directions Y is not hindered. Therefore, the hip joint J2 is not restrained, which allows the ilium LM to smoothly rotate medially and the sacrum S to smoothly nutate. Consequently, the breathing can be promoted. Over the hip joint placement region 7 in FIG. 5, the lower portion of the ilium LM and the upper portion of the ischium SN of the hip bone HB are placed. In this regard, the parts conforming to these portions may come into contact with a bottom surface in the space 7*a* of the hip joint placement region 7 and receive a body pressure unless the hip joint J2 is pressed.

Figure 9:
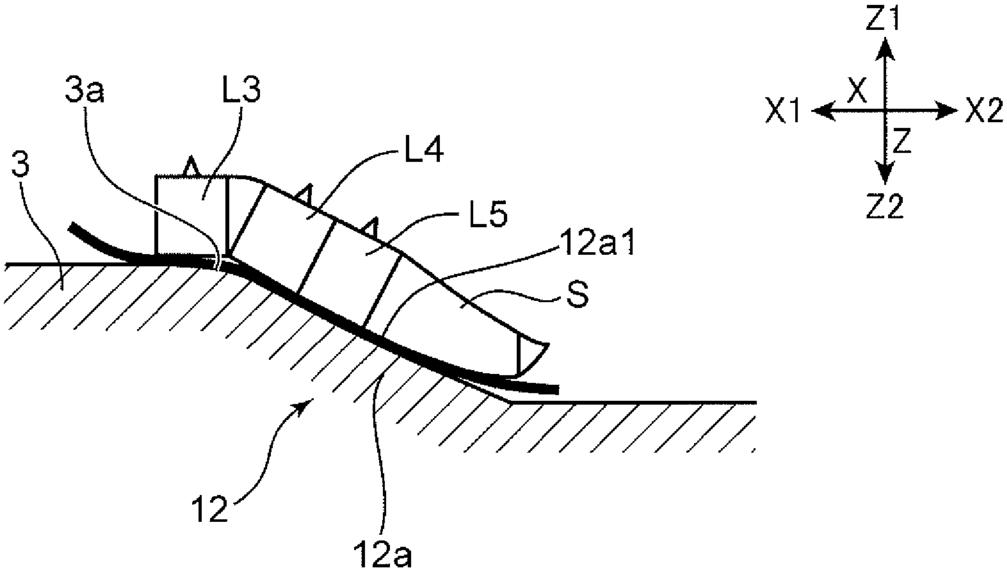
FIG. 9 is a cross-sectional view illustrating, as a modification of the invention, a state of a part conforming to the sacrum and a lumbar vertebra being supported by a placement surface of the sacrum support portion, the placement surface gradually lowering as advancing toward a leg.

Modifications (A) In the embodiment, the placement surface 12*a*1 of the sacrum support portion 12*a* is on a horizontally flat plane, but the invention is not limited thereto. As a modification of the invention, as shown in FIG. 9, the height of the sacrum support portion 12*a* may be set to gradually lower as advancing toward the leg of the person 50 in the supine position (as going in the direction of the leg-toward direction X2), and the sacrum support portion 12*a* may support at least a continuous underside from the part conforming to the sacrum S to a part conforming to a lumbar vertebra adjacent to the sacrum S of the person 50 in the supine position. In other words, the load on the lumbar vertebrae L3 to L5 connected to the sacrum S may be reduced by forming the placement surface 12*a*1 of the sacrum support portion 12*a* into such a sloping shape that it lowers as advancing in the leg-toward direction X2 and utilizing the sloping shape of the placement surface 12*a*1.

This configuration enables the sacrum support portion 12*a* to come into broad contact with the parts conforming to the sacrum S and the lumbar vertebrae L4 to L5 to support the parts while dispersing the body pressure, when the sacrum S nutates forward (in the upward direction Z1). Consequently, the load on the lumbar vertebrae L3 to L5 connected to the sacrum S can be further reduced.

In other words, as shown in FIG. 9, since the whole of the parts conforming the lumbar vertebrae L4 to L5 and the sacrum S are placed on the placement surface 12*a*1 in the sloping shape, a bending angle between the lumbar vertebrae L3 and L4 at the leg side edge 3*a* of the back support portion 3 becomes small. The bending angle between the lumbar vertebrae L3 and L4 in this case is much smaller than that in a case where the sacrum S is partially placed on the leg side edge 12*a*2 of the horizontal placement surface 12*a*1 as shown in FIG. 8, from which it can be understood that the load on the lumbar vertebrae L3 to L5 is reduced.

(B) In the embodiment, an exemplary mattress 1 that is integrally made of material such as urethane is described, but the invention is not limited thereto. As another modification of the invention in a case that the sacrum adaptation portion 12 includes the sacrum support portion 12*a* that supports the part conforming to the sacrum S of the person 50 in the supine position and the sacrum support portion 12*a* is set to have a height being the same as the height of the ilium support portion 11, the hardness of the sacrum support portion 12*a* may be set to be lower than the hardness of the ilium support portion 11 by changing properties of at least one of the materials of the ilium support portion 11 and the sacrum support portion 12*a*.

In this configuration, the sacrum support portion 12*a* is softer than the ilium support portion 11, which enables the sacrum support portion 12*a* to support the sacrum S so that it can nutate while reducing the reaction force (body pressure) from the sacrum support portion 12*a* onto the part conforming to the sacrum S. Consequently, the load on the lumbar vertebrae L3 to L5 connected to the sacrum S can be reduced.

(C) In the embodiment, the pair of ilium support portions 11 has the respective placement surfaces 11*a* on which the parts conforming to the iliac crests LMa are placed and the inner upper edge 11*b*, which is an edge of the placement surface 11*a* closer to the sacrum adaptation portion 12. The inner upper edge 11*b* is angular as shown in FIG. 1. As a modification of the invention, the inner upper edge 11*a*2 may be beveled to have a planar or round shape.

In this case, since the inner upper edge 11*b* is beveled, the body pressure onto the inner upper edge 11*b* is dispersed even if the inner upper edge 11*b* of the ilium support portion 11 comes into contact with the part conforming to the iliac crest LMa in the supine position. Thus, the pain and the discomfort in the supine position can be reduced.

(D) In the embodiment, as an exemplary sacrum adaptation portion 12 arranged between the pair of ilium support portions 11 and located below the sacrum S, the sacrum adaptation portion 12 including the sacrum support portion 12*a* for supporting the part conforming to the sacrum S is described, but the invention is not limited thereto. The invention is required only that: the sacrum adaptation portion 12 be arranged between the pair of ilium support portions 11 and located below the sacrum S; and the pair of ilium support portions 11 and the sacrum adaptation portion have such a configuration that the body pressure onto the sacrum adaptation portion onto the part conforming to the sacrum S of the person in the supine position is lower than the body pressures from the pair of ilium support portions 11 onto the parts conforming to the pair of ilia LM of the person 50 in the supine position.

Figure 10:
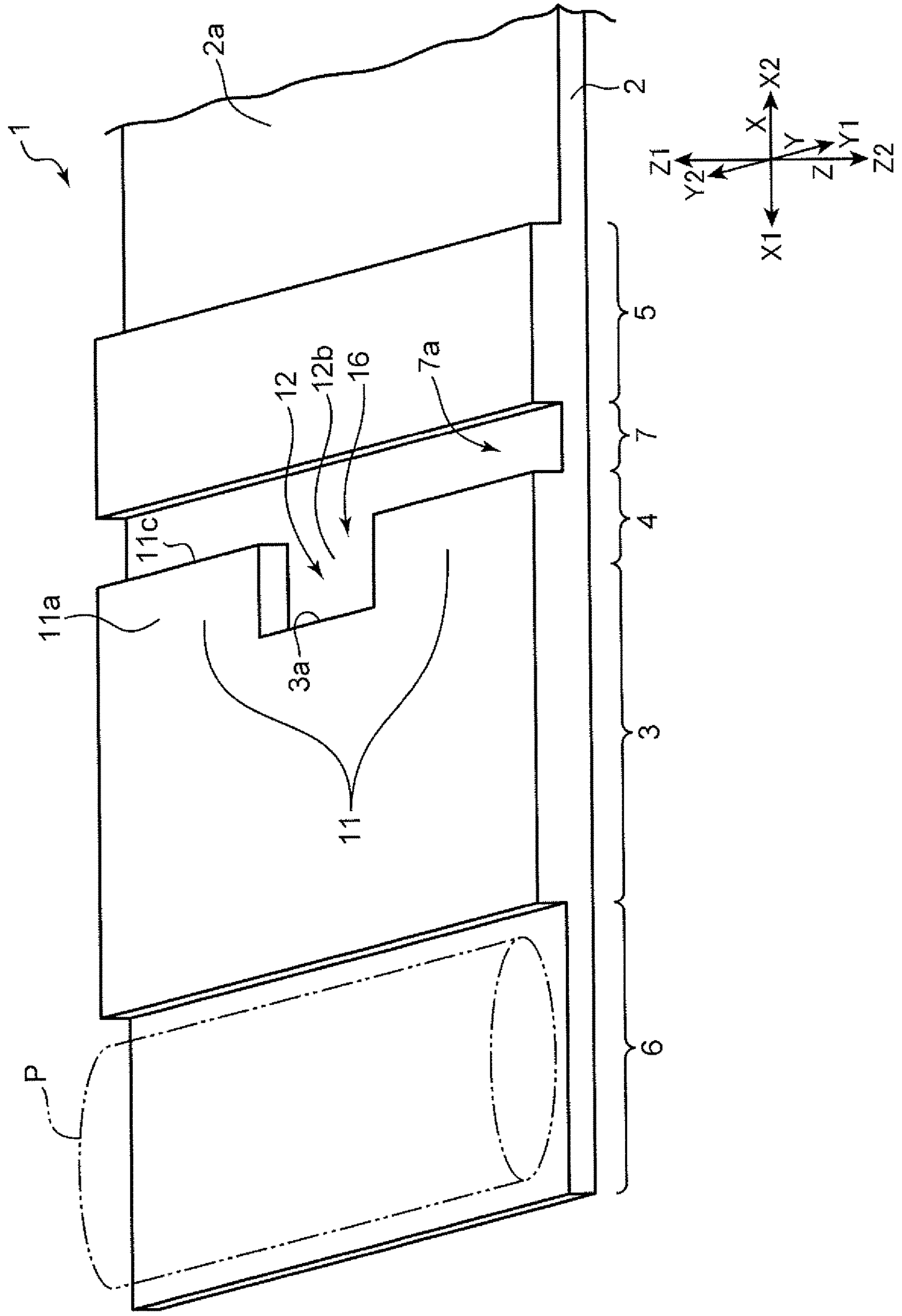
FIG. 10 is a perspective view of a mattress which is another modification of the invention, and includes a sacrum adaptation portion having a sacrum non-support portion.

Thus, as a modification of the invention, the sacrum adaptation portion 12 may entirely include a sacrum non-support portion 12*b* that is spaced away from a part conforming to the sacrum S of the person in the supine position to render non-support to the part conforming to the sacrum S, as shown in FIG. 10. In this configuration, there is no sacrum support portion 12*a* that protrudes from the upper surface 2*a* of the base portion 2 in the upward direction Z1; there is only a sacrum non-support portion 12*b* at the same height as the upper surface 2*a*. The sacrum non-support portion 12*b* and opposite surfaces of the pair of ilium support portions 11 on both sides thereof forms a space 16.

In this configuration, the sacrum non-support portion 12*b*, which is entirely included in the sacrum adaptation portion 12 and is spaced away from the part conforming to the sacrum S, renders non-support to the part conforming to the sacrum S. Thus, the sacrum S is received in the space 16 above the sacrum non-support portion 12*b*. This configuration enables supporting the part conforming to the sacrum S so that it can nutate without receiving any effects by the reaction force (body pressure) from the sacrum non-support portion 12*b* that is included in the sacrum adaptation portion 12. Consequently, the load on the lumbar vertebrae L3 to L5 connected to the sacrum S can be reduced.

Figure 11:
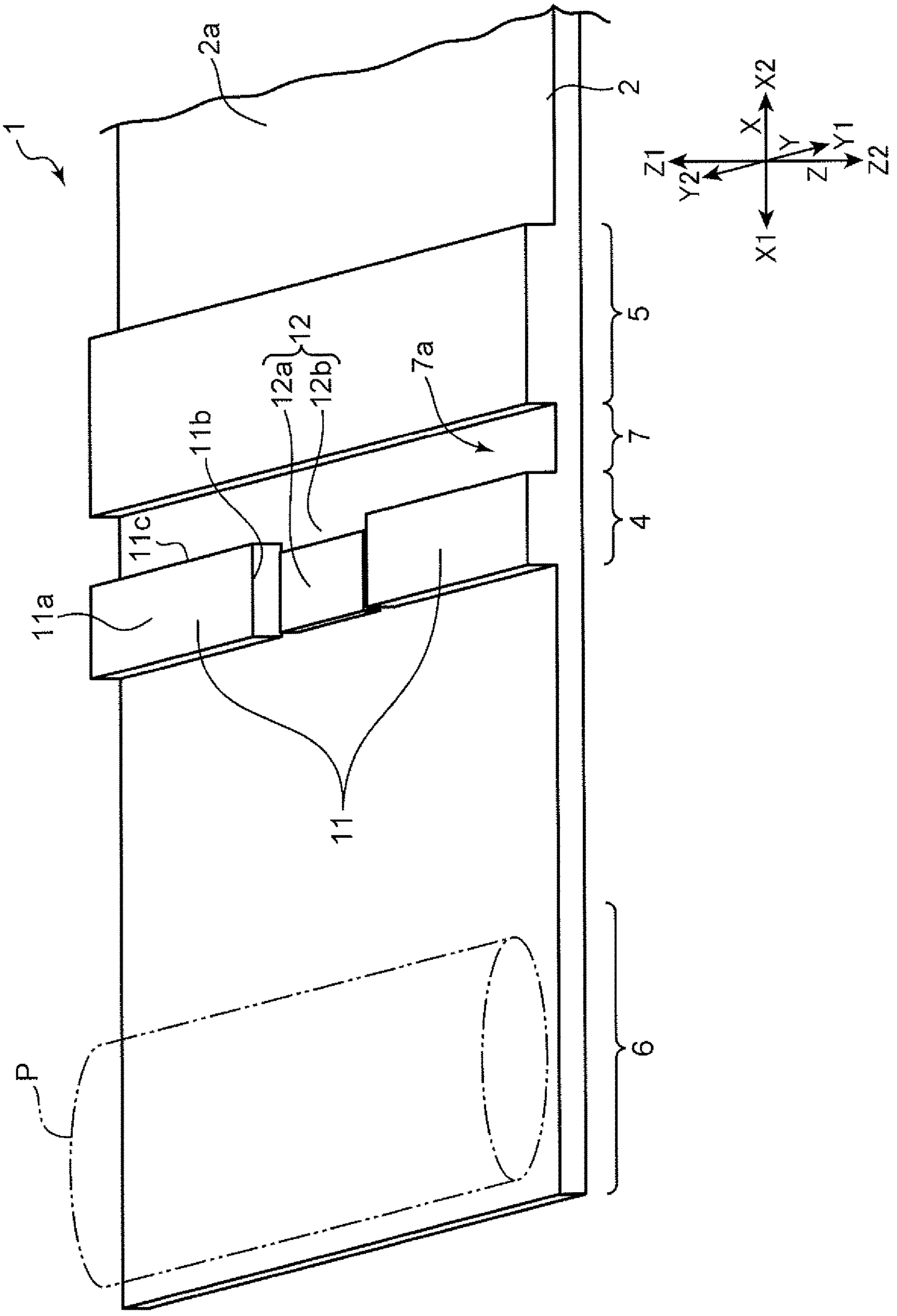
FIG. 11 is a perspective view of a mattress which is further another modification of the invention, and includes no back support portion.

(E) In the embodiment, the back support portion 3 is described as an exemplary protrusion portion for supporting the back 52 of the person 50 in the supine position as shown in FIGS. 1 to 5, but the invention is not limited thereto. For example, as a modification of the invention, the back support portion 3 serving as the protrusion portion may be omitted and the upper surface 2*a* of the base portion 2 may support the back 52, as shown in FIG. 11.

(G) In the mattress 1 in the embodiment, as shown in FIGS. 1 to 5, the back support portion 3, the pelvis support portion 4 (the pair of ilium support portions 11 and the sacrum support portion 12*a*), and the leg support portion 5 each have a shape of a flat, rectangular, and thick plate, but the invention is not limited thereto, and may be formed to have a curved shape conforming to the body shape of the person 50 in the supine position. Particularly, the portion that supports a part conforming to the sacroiliac joint J1 is preferably formed to have such a shape with a smooth slope or a space that no stress is given onto the part conforming to the sacroiliac joint J1.

Summary of Embodiment

The summary of the embodiment is as follows.

A mattress according to the embodiment for supporting at least a part conforming to a pelvis of a person in a supine position, includes: a pair of ilium support portions arranged below respective parts conforming to at least widthwise outer portions of iliac crests of a pair of ilia of the pelvis for individually supporting parts conforming to the pair of ilia from below; and a sacrum adaptation portion arranged between the pair of ilium support portions and located below a part conforming to a sacrum between the pair of ilia of the pelvis, wherein the pair of ilium support portions and the sacrum adaptation portion have such a configuration that a body pressure onto the sacrum adaptation portion is lower than a body pressure onto the pair of ilium support portions.

The mattress includes the pair of ilium support portions arranged at respective positions below the iliac crests, which are edges closer to the head of the person in the supine position, of the pair of ilia of the pelvis so as to come into contact with the parts conforming to at least the widthwise outer portions of the iliac crests, and the sacrum adaptation portion arranged between the pair of ilium support portions. Thus, the pair of ilium support portions can individually support the parts conforming to the pair of ilia from below with coming into contact with the respective parts conforming to the iliac crests of the pair of ilia, when the person is in the supine position on the mattress having the configuration above. At this time, the pair of ilia receives a reaction force (body pressure) from the ilium support portions on the parts conforming to the iliac crests, which promotes the movement of turning forward and toward the center with respect to the body (i.e., rotating medially).

The pair of ilium support portions and the sacrum adaptation portion of the mattress have such a configuration that the body pressure onto the sacrum adaptation portion is lower than the body pressure onto the pair of ilium support portions. Thus, the sacrum between the pair of ilia can turn forward and toward the leg in accordance with the medial rotation of the pair of ilia, i.e., can nutate, without being obstructed by the reaction force (body pressure) from the sacrum adaptation portion. The nutation of the sacrum causes the diaphragm connected to the lumbar vertebrae continued to the sacrum to move in the direction toward the head of the person in the supine position. This makes the rib cage contract, thereby facilitating the exhalation. When the exhalation is facilitated, the inhalation, which is the counter action thereof, is also facilitated. Consequently, the breathing in the supine position can be promoted.

Preferably, a height of the ilium support portion of the mattress may be greater than a height of the sacrum adaptation portion.

In this configuration, the ilium support portion can reliably support the part conforming to the ilium to promote the medial rotation of the ilium and the nutation of the sacrum, while reducing the reaction force (body pressure) from the sacrum support portion onto the part conforming to the sacrum. Consequently, the breathing in the supine position can be reliably promoted.

Preferably, the pair of ilium support portions of the mattress may have respective placement surfaces on which parts conforming to the iliac crests are placed and an edge of the placement surface closer to the sacrum adaptation portion may be beveled.

In this configuration, since the edge of the ilium support portion closer to the sacrum adaptation portion is beveled, the body pressure onto the edge is dispersed even if the edge comes into contact with the part conforming to the iliac crest in the supine position. Thus, the pain and the discomfort in the supine position can be reduced.

Preferably, the mattress may further include a back support portion that supports a back of the person in the supine position and a height of the back support portion may be the same as the height of the ilium support portion.

In this configuration, the mattress supports the back and the part conforming to the ilium of the person in the supine position on the same plane. Thus, the discomfort due to the ilium support portion protruding upward can be reduced. The ilium support portion is preferably slightly higher than the back support portion to enhance the effect by the ilium support portion of causing the ilium to medially rotate.

Preferably, the sacrum adaptation portion of the mattress may include a sacrum support portion for supporting a portion of the sacrum closer to a head of the person in the supine position, and a sacrum non-support portion spaced away underneath from a portion of the sacrum closer to a leg of the person in the supine position to render non-support to the portion closer to the leg.

In this configuration, the portion of the sacrum closer to the head is located above the portion thereof closer to the leg after the nutation of the sacrum. Therefore, in the configuration above, the sacrum support portion partially supports the portion of the sacrum closer to the head, and the sacrum non-support portion, which is spaced away underneath from the portion closer to the leg, renders non-support to the portion. This enables adjusting the body pressure onto the ilium support portion, the body pressure onto the sacrum support portion, and the body pressure onto the sacrum non-support portion so as to gradually lower one after another in this order. Additionally, it is possible to further lower the average body pressure onto the sacrum from the whole of the sacrum adaptation portion with keeping the sacrum tilting forward. This can promote a smooth nutation of the sacrum. Consequently, the breathing in the supine position can be more reliably promoted.

Preferably, the height of the sacrum support portion of the mattress may be made to gradually lower as advancing toward the leg of the person in the supine position, and the sacrum support portion may support at least a continuous underside from the part conforming to the portion of the sacrum closer to the head of the person to a part conforming to a lumbar vertebra adjacent to the sacrum of the person in the supine position.

This configuration enables the sacrum support portion to come into broad contact with the parts conforming to the sacrum and the lumbar vertebra to support the parts while dispersing the body pressure, when the sacrum nutates forward. Consequently, the load on the lumbar vertebrae connected to the sacrum can be further reduced.

Preferably, the sacrum adaptation portion of the mattress may include a sacrum support portion that supports a part conforming to the sacrum of the person in the supine position, and the sacrum support portion may have a height being the same as a height of the ilium support portion and a hardness lower than a hardness of the ilium support portion.

In this configuration, the sacrum support portion is softer than the ilium support portion, which enables the sacrum support portion to support the sacrum so that it can nutate while reducing the reaction force (body pressure) from the sacrum support portion onto the sacrum. Consequently, the load on the lumbar vertebrae connected to the sacrum can be reduced.

Preferably, the mattress may include a sacrum non-support portion that is spaced away from a part conforming to the sacrum of the person in the supine position to render non-support to the sacrum.

This configuration enables supporting the sacrum so that it can nutate without receiving any effects by the reaction force (body pressure) from the sacrum non-support portion that is included in the sacrum adaptation portion. Consequently, the load on the lumbar vertebrae connected to the sacrum can be reduced.

The mattress in the embodiment having the configuration above can promote the breathing in the supine position.

The invention claimed is:

1. A mattress for supporting at least a part corresponding to a pelvis of a person's body in a supine position, comprising:

a pair of ilium support portions arranged below respective parts corresponding to at least widthwise outer portions of iliac crests of a pair of ilia of the pelvis for individually supporting parts corresponding to the pair of ilia of a person's body from below; and a sacrum adaptation portion arranged between the pair of ilium support portions of the mattress and located below a part corresponding to a sacrum between the pair of ilia of the pelvis of a person's body, wherein the pair of ilium support portions and the sacrum adaptation portion have such a configuration that a body pressure onto the sacrum adaptation portion is lower than a body pressure onto the pair of ilium support portions, and a height of the ilium support portion is greater than a height of the sacrum adaptation portion, and the sacrum adaptation portion includes:

a sacrum support portion having a height lower than the height of the ilium support portion for supporting a part corresponding to a portion of the sacrum closer to a head of the person in the supine position, and a sacrum non-support portion having a height lower than the height of the sacrum support portion of the mattress and spaced away underneath from a portion of the sacrum closer to a leg of the person's body in the supine position to render non-support to a part corresponding to the portion closer to the leg, wherein the sacrum support portion and the sacrum non-support portion are aligned with each other along the longitudinal direction of the mattress.

2. The mattress according to claim 1, wherein the height of the sacrum support portion of the mattress gradually lowers as advancing toward the leg of the person's body in the supine position, and the sacrum support portion supports at least a continuous underside from the part of the person's body corresponding to the portion of the sacrum closer to the head of the person to a part corresponding to a lumbar vertebra adjacent to the sacrum of the person's body in the supine position.

3. The mattress according to claim 1, further comprising:

a back support portion that supports a back of the person's body in the supine position, wherein a height of the back support portion is the same as the height of the ilium support portion.

4. A mattress for supporting at least a part corresponding to a pelvis of a person's body in a supine position, comprising:

a pair of ilium support portions arranged below respective parts corresponding to at least widthwise outer portions of iliac crests of a pair of ilia of the pelvis for individually supporting parts corresponding to the pair of ilia of a person's body from below; and a sacrum adaptation portion arranged between the pair of ilium support portions of the mattress and located below a part corresponding to a sacrum between the pair of ilia of the pelvis, of the person's body wherein the pair of ilium support portions and the sacrum adaptation portion have such a configuration that a body pressure onto the sacrum adaptation portion is lower than a body pressure onto the pair of ilium support portions, and the sacrum adaptation portion includes a sacrum support portion that supports a part corresponding to the sacrum of the person's body in the supine position, and the sacrum support portion has a height being the same as a height of the ilium support portion and a hardness lower than a hardness of the ilium support portion, wherein the pair of ilium support portions and the sacrum support portion are aligned with each other along the width direction of the mattress.

* * * * *